United States Patent
Sugiura et al.

(10) Patent No.: US 9,595,735 B2
(45) Date of Patent: Mar. 14, 2017

(54) METHOD FOR PRODUCING SULFIDE SOLID ELECTROLYTE MATERIALS

(75) Inventors: Koichi Sugiura, Susono (JP); Hiroki Kubo, Susono (JP); Yuichi Hashimoto, Numazu (JP); Takayuki Koyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/130,164

(22) PCT Filed: Jul. 12, 2012

(86) PCT No.: PCT/IB2012/001371
§ 371 (c)(1),
(2), (4) Date: Dec. 30, 2013

(87) PCT Pub. No.: WO2013/008089
PCT Pub. Date: Jan. 17, 2013

(65) Prior Publication Data
US 2014/0141339 A1  May 22, 2014

(30) Foreign Application Priority Data
Jul. 13, 2011 (JP) ................. 2011-155189

(51) Int. Cl.
H01M 10/0562 (2010.01)
H01B 1/10 (2006.01)
H01M 10/0525 (2010.01)

(52) U.S. Cl.
CPC .......... *H01M 10/0562* (2013.01); *H01B 1/10* (2013.01); *H01M 10/0525* (2013.01); *H01M 2300/0068* (2013.01); *Y02E 60/122* (2013.01)

(58) Field of Classification Search
None
See application file for complete search history.

(56) References Cited

U.S. PATENT DOCUMENTS

| 5,500,291 A * | 3/1996 | Minami et al. ............... 429/206 |
| 2007/0196739 A1 | 8/2007 | Seino et al. |
| 2010/0151335 A1 | 6/2010 | Senga et al. |
| 2011/0049745 A1* | 3/2011 | Katayama et al. ........... 264/104 |
| 2011/0108642 A1* | 5/2011 | Hama et al. .................... 241/16 |
| 2011/0171371 A1* | 7/2011 | Li et al. ......................... 427/122 |
| 2011/0177142 A1* | 7/2011 | Nolte et al. ................... 424/401 |
| 2012/0009484 A1 | 1/2012 | Aburatani et al. |

FOREIGN PATENT DOCUMENTS

| CN | 102005608 A | 4/2011 |
| JP | A-07-330312 | 12/1995 |
| JP | A-2008-004459 | 1/2008 |
| JP | A-2008-234843 | 10/2008 |
| JP | A-2009-110920 | 5/2009 |
| JP | 2010-040511 A | 2/2010 |
| JP | A-2011-054327 | 3/2011 |
| JP | A-2012-243496 | 12/2012 |
| WO | WO 2005/040039 A1 | 5/2005 |
| WO | WO 2010/116732 A1 | 10/2010 |
| WO | WO 2012/156795 A1 | 11/2012 |

\* cited by examiner

*Primary Examiner* — Patrick Ryan
*Assistant Examiner* — Wyatt McConnell
(74) *Attorney, Agent, or Firm* — Oliff PLC

(57) ABSTRACT

A method for producing a sulfide solid electrolyte material includes a step of adding an ether compound to a coarse-grained material of a sulfide solid electrolyte material and microparticulating the coarse-grained material by a pulverization treatment.

14 Claims, 5 Drawing Sheets

EXAMPLE 1

EXAMPLE 4

EXAMPLE 2

EXAMPLE 5

EXAMPLE 3

COMPARATIVE
EXAMPLE 1

COMPARATIVE
EXAMPLE 3

COMPARATIVE
EXAMPLE 2

METHOD FOR PRODUCING SULFIDE SOLID ELECTROLYTE MATERIALS

BACKGROUND OF THE INVENTION

1. Field of the Invention

The present invention relates to a method for producing a sulfide solid electrolyte material, which can simultaneously achieve microparticulation of a sulfide solid electrolyte material, a high recovery rate thereof and maintenance of an ion conductivity thereof.

2. Description of Related Art

In recent years, as information-related devices such as video cameras and portable telephones and communication devices rapidly prevail, development of batteries used as a power source thereof is gaining importance. Also in automobile industries, development of high-output-power and high-capacity batteries for electric automobiles or hybrid automobiles is under way. At the present time, among various batteries, lithium batteries are gathering attention from the viewpoint of high energy density.

Lithium batteries that are commercially available at the present time use an electrolytic solution containing an inflammable organic solvent. Accordingly, a safety device for suppressing a temperature increase during short-circuiting has to be attached and an improvement in structures and materials for suppressing short-circuiting is necessary. In contrast, a whole solid-state lithium battery in which an electrolytic solution is replaced by a solid electrolyte layer does not use an inflammable organic solvent inside a battery. As a result, it is considered that the safety device can be simplified and the whole solid-state lithium battery is excellent in production cost and productivity. In addition, as a solid electrolyte material used for a solid electrolyte layer like this, a sulfide solid electrolyte material is known.

In order to obtain high-performance whole solid-state batteries, a sulfide solid electrolyte material has to be microparticulated. In Japanese Patent Application Publication No. 2008-004459 (JP 2008-004459 A), for example, a sulfide solid electrolyte microparticles having an average particle size of 0.1 to 10 μm is disclosed. Further, JP 2008-004459 A discloses to use amide, amine salt, or ester, which has an aliphatic alkyl or aryl group, as a dispersion stabilizer when pulverizing a sulfide solid electrolyte material.

A sulfide solid electrolyte material contains sulfur (S). Accordingly, it is a material softer than, for example, an oxide solid electrolyte material. As a result, the sulfide solid electrolyte material tends to form a solid/solid interface and the surface resistance thereof can be advantageously readily reduced. In contrast, since the sulfide solid electrolyte material is a soft material, there is a disadvantage that it is difficult to microparticulate the material. As one of reasons, as described below, granulation occurs simultaneously with pulverization. Further, when a sulfide solid electrolyte material is pulverized by media-type pulverization (ball milling, for example), the sulfide solid electrolyte material adheres to the media to result in low recovery rate of the sulfide solid electrolyte material. In addition, it is considered to use, during pulverization, a dispersing agent to inhibit the sulfide solid electrolyte material from granulating and adhering to the media. However, there is a possibility that conventional dispersing agents cause an ion conductivity of the sulfide solid electrolyte material to deteriorate.

SUMMARY OF THE INVENTION

The present invention provides a method for producing a sulfide solid electrolyte material that is capable of simultaneously achieving microparticulation of a sulfide solid electrolyte material, a high recovery rate thereof and maintenance of an ion conductivity thereof.

According to a first aspect of the present invention, a method for producing a sulfide solid electrolyte material includes a step of adding an ether compound to a coarse-grained material of a sulfide solid electrolyte material and microparticulating the coarse-grained material by a pulverization treatment.

According to the first aspect, by using an ether compound as a dispersing agent, microparticulation of the sulfide solid electrolyte material, a high recovery rate thereof and maintenance of an ion conductivity thereof can be simultaneously achieved.

The ether compound may have two hydrocarbon groups bonded to an oxygen element, and the number of carbon atoms of the hydrocarbon group may be 10 or less, respectively. This is because when the number of carbon atoms is too large, it may be difficult to remove the ether compound by drying.

The coarse-grained material may contain Li, A (A is at least one kind of P, Si, Ge, Al and B) and S. This is because a coarse-grained material excellent in an Li ion conductivity can be obtained.

The coarse-grained material may further include X (X is a halogen element). This is because the Li ion conductivity of a coarse-grained material can be improved.

The pulverization treatment may be a media type pulverization treatment and the total pulverization energy E per unit weight of the coarse-grained material, which is defined by the following formula (1), may be in the range of 50 to 450 J·sec/g. This is because a more microparticulated sulfide solid electrolyte material can be obtained.

$$E = \tfrac{1}{2} nmv^2 / s \cdot t \qquad \text{formula (1)}$$

(n: the number (pieces) of media, m: weight per one media (kg), v: speed of media (m/s), s: amount of the coarse-grained material (g), and t: processing time (sec)).

In the respective aspects of the present invention, an effect that microparticulation of the sulfide solid electrolyte material, a high recovery rate thereof and maintenance of an ion conductivity thereof can be simultaneously achieved is exerted.

A second aspect of the present invention relates to a sulfide solid electrolyte material obtained by the method for producing a sulfide solid electrolyte material according to the first aspect. Further, a third aspect of the present invention relates to a whole solid-state battery that contains the sulfide solid electrolyte material according to the second aspect in at least one of a positive electrode active material layer, a negative electrode active material layer and a solid electrolyte layer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A method for producing a sulfide solid electrolyte material according to an embodiment of the present invention will be detailed below.

A method for producing a sulfide solid electrolyte material of the present embodiment includes a step of adding an ether compound to a coarse-grained material of a sulfide solid electrolyte material and microparticulating the coarse-grained material by a pulverization treatment.

Figure 1:
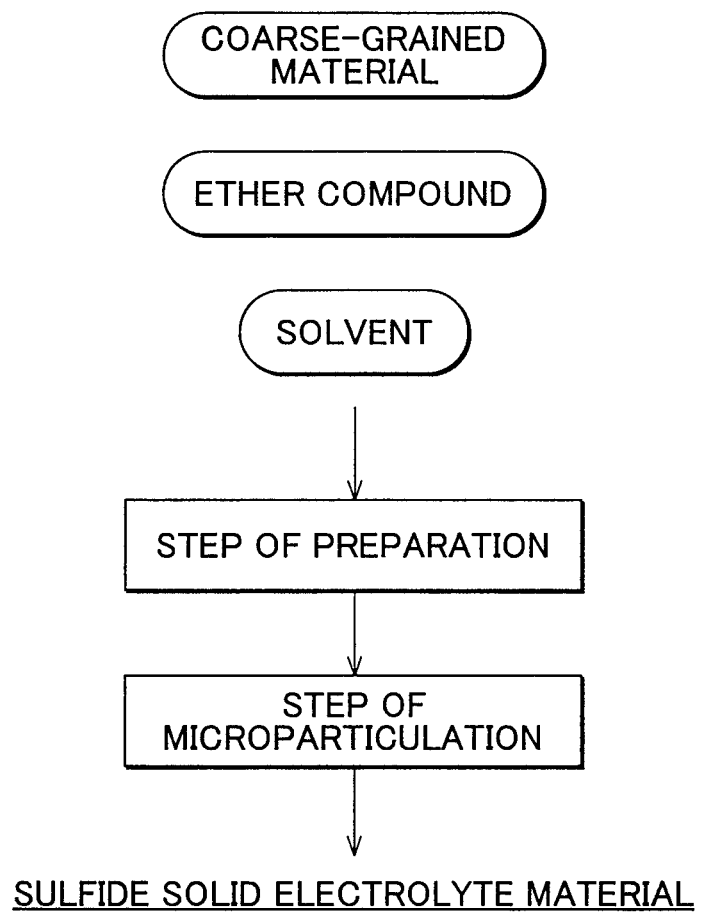
FIG. 1 is a flowchart showing an example of a method for producing a sulfide solid electrolyte material according to an embodiment of the present invention.

FIG. 1 is a flowchart showing an example of a method for producing a sulfide solid electrolyte material of the present embodiment. In FIG. 1, firstly, a coarse-grained material of a sulfide solid electrolyte material (LiI—$Li_2S$—$P_2S_5$ glass, for example), an ether compound (dibutyl ether, for example) and a solvent (dehydrated heptane, for example) are mixed to prepare a mixture (dispersion) (a step of preparation). Then, the mixture is charged into a zirconia pot, zirconia balls were further charged into the pot, and the pot is hermetically sealed. Thereafter, the pot is attached to a satellite ball mill machine and mechanical milling is conducted under predetermined conditions to pulverize the coarse-grained material (a step of microparticulation). Thereby, a microparticulated sulfide solid electrolyte material can be obtained. Further, though not shown in the drawing, in the present invention, without preparing a mixed solution, an ether compound (and a solvent as required) may be added during pulverization of the coarse-grained material.

Figure 2A:
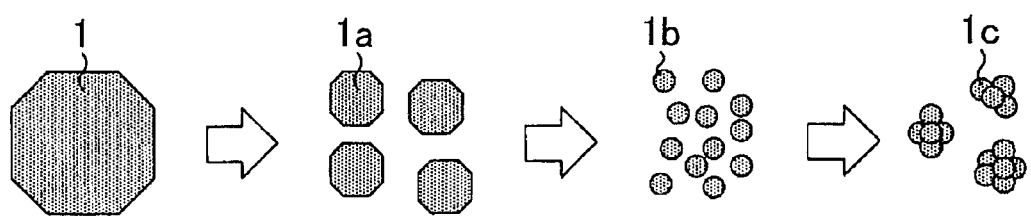
FIGS. 2A and 2B are schematic diagrams for describing a situation of pulverization due to the difference of hardness of the sulfide solid electrolyte material.
Figure 2B:
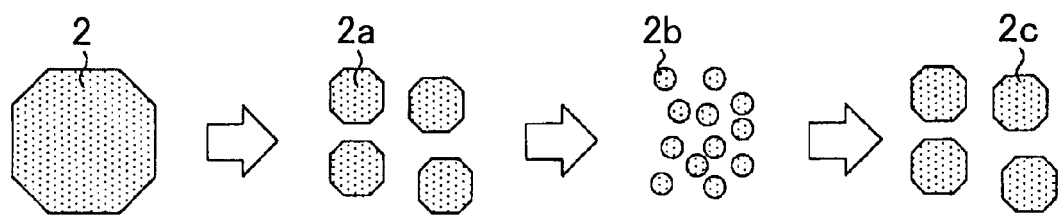
Figure 3A:
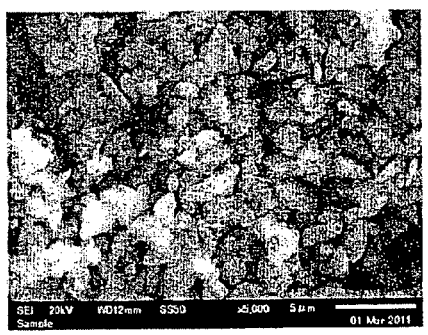
FIGS. 3A to 3E are SEM images of sulfide solid electrolyte materials obtained from Examples 1 to 5.
Figure 3D:
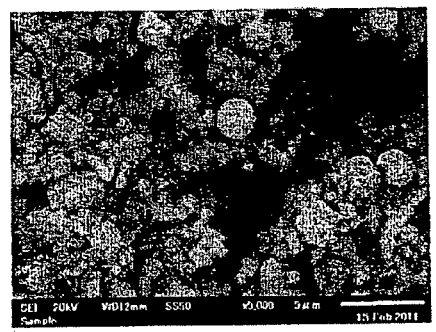
Figure 3B:
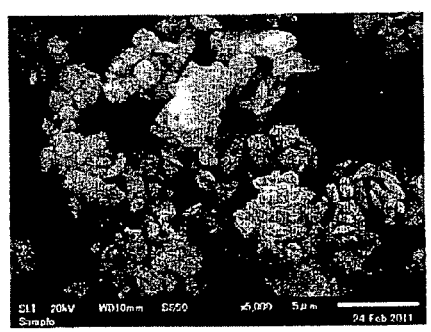
Figure 3E:
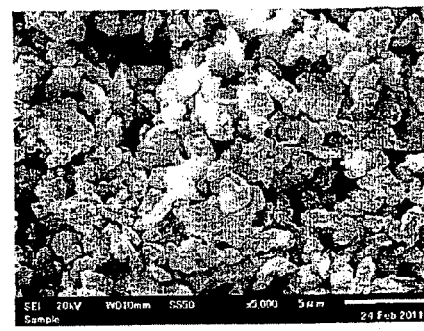
Figure 3C:
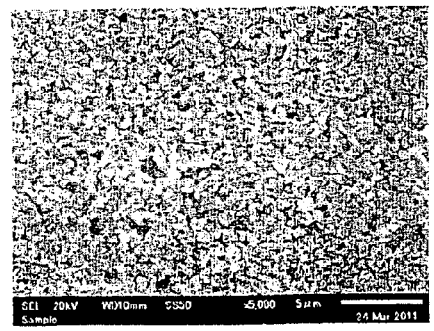
Figure 4A:
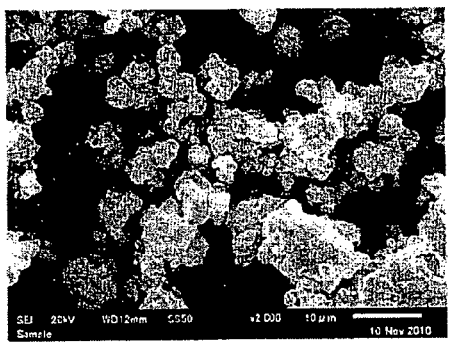
FIGS. 4A to 4C are SEM images of sulfide solid electrolyte materials obtained from Comparative Examples 1 to 3.
Figure 4C:
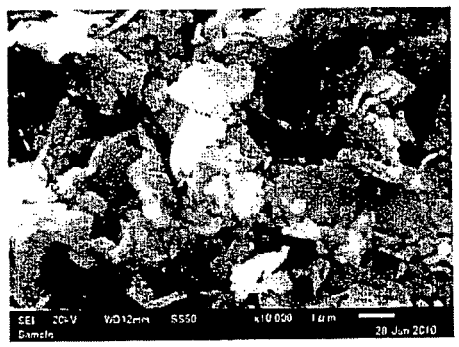
Figure 4B:
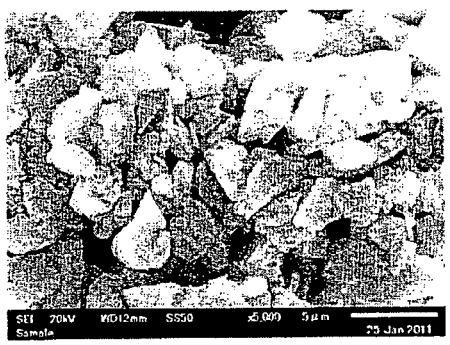

FIGS. 2A and 2B are schematic diagrams describing a situation of pulverization due to the difference of the hardness of the sulfide solid electrolyte material. As shown in FIG. 2A, when a hard solid electrolyte material 1 such as an oxide solid electrolyte material is pulverized, initial pulverization generates particles 1a and further pulverization generates microparticulates 1b. When the microparticulation proceeds by a certain extent, microparticles aggregate each other to form secondary particles 1c. On the other hand, as shown in FIG. 2B, when a soft solid electrolyte material 2 such as a sulfide solid electrolyte material is pulverized, initial pulverization generates particles 2a, and further pulverization generates microparticles 2b. When the microparticulation proceeds by a certain extent, since the microparticles 2b are soft, granulation is generated as if kneaded, and thereby particles 2c having a large particle size are generated once more. As described above, when the sulfide solid electrolyte material is pulverized, pulverization and granulation are simultaneously caused and thereby microparticulation becomes difficult. In the present embodiment, by using an ether compound, granulation can be prevented and microparticulated sulfide solid electrolyte material can be obtained.

According to the present embodiment, by using an ether compound as a dispersing agent, microparticulation of a sulfide solid electrolyte material, a high recovery rate thereof and maintenance of an ion conductivity thereof can be simultaneously achieved. The reason why the microparticulation of a sulfide solid electrolyte material and high recovery rate thereof can be simultaneously achieved by adding an ether compound is considered as follows. That is, it is considered that during pulverization, when an ether compound is present on a surface of particles of the coarse-grained material, a surface of particles is charged and thereby electrical repulsion is generated against other particles and media. As a result, even when the pulverization proceeds, the particles are inhibited from granulating each other and from adhering to the media, and accordingly, the sulfide solid electrolyte material can be microparticulated and recovered at high yield. Further, the reason why the ion conductivity of the sulfide solid electrolyte material can be maintained when an ether compound is added is considered that the ether compound does not react with the sulfide solid electrolyte material and thereby the sulfide solid electrolyte material is not deteriorated.

Further, the present inventors have variously studied by using, as a compound other than the ether compound, a low molecular weight compound as a dispersing agent. However, it has been found that in many cases, a compound does not have a function of inhibiting the sulfide solid electrolyte material from granulating during pulverization and from adhering to the media. On the other hand, when a polar low molecular weight compound is used to impart electrical repulsion, the polar low molecular weight compound reacts with the sulfide solid electrolyte material and deteriorates it. In contrast, when an ether compound is used, a function of inhibiting the sulfide solid electrolyte material from granulating during pulverization and from adhering to the media is confirmed and, further, the sulfide solid electrolyte material is suppressed from deteriorating.

Still further, in the present embodiment, since the microparticulated sulfide solid electrolyte material can be obtained, the energy density and output density of a battery can be advantageously improved. Further, in the present embodiment, the microparticulated sulfide solid electrolyte material can be advantageously obtained at a high recovery rate. The recovery rate means a rate of an amount of recovered microparticulated sulfide solid electrolyte material with respect to an amount of charged coarse-grained material. Further, in the present embodiment, since a sulfide solid electrolyte material of which deterioration in the ion conductivity is suppressed can be obtained, the output density of a battery can be advantageously improved. Steps of the method for producing a sulfide solid electrolyte material of the present embodiment will be described one by one below.

1. Step of Microparticulation

A step of microparticulation in the present embodiment is a step of adding an ether compound to a coarse-grained material of a sulfide solid electrolyte material and microparticulating the coarse-grained material by a pulverization treatment.

In the present embodiment, a mixture containing a coarse-grained material of a sulfide solid electrolyte material and an ether compound is preferably prepared. The mixture may contain a solvent, as required. Further, the mixture is preferably a dispersion or a slurry where a coarse-grained material of a sulfide solid electrolyte material is dispersed in an ether compound (and solvent). On the other hand, as described above, in the present invention, without preparing a mixed solution, an ether compound (and a solvent, as required) may be added during pulverization of the coarse-grained material.

(1) Ether Compound

An ether compound in the present embodiment is not particularly limited as long as it has an ether group (C—O—C). Among these, an ether compound is preferred to have two hydrocarbon groups bonded to an oxygen element. This is because the ether compound has low reactivity with the coarse-grained material. Further, the number of carbon atoms of each the hydrocarbon groups is preferably 10 or less. This is because when the number of carbon atoms is too large, the ether compound is difficult to remove by drying.

The hydrocarbon group may be in the form of a chain or a ring. The hydrocarbon group is preferred to be a saturated hydrocarbon group or an aromatic hydrocarbon group. Examples of the hydrocarbon groups include: alkyl groups such as a methyl group, an ethyl group, a propyl group, an isopropyl group, and a butyl group; cycloalkyl groups such as a cyclopentyl group and a cyclohexyl group; and aromatic hydrocarbon groups such as a phenyl group and a benzyl group. Specific examples of the ether compounds include dimethyl ether, methyl ethyl ether, dipropyl ether, dibutyl ether, cyclopentyl methyl ether, and anisole. A molecular weight of the ether compound is preferably in the range of 46 to 278, for example, and more preferably in the range of 74 to 186.

An amount of added ether compound is not particularly limited as long as it is a ratio by which a microparticulated sulfide solid electrolyte material can be obtained. Among these, an amount of added ether compound is preferably in the range of 0.01 to 100% by weight with respect to the coarse-grained material, more preferably in the range of 0.1 to 100% by weight, and particularly preferably in the range of 1 to 50% by weight. This is because when an amount of added ether compound is too small, it may be difficult to prevent the sulfide solid electrolyte material from granulating during pulverization and from adhering to the media, and, when an amount of added ether compound is too large, it may be difficult to remove the ether compound.

(2) Coarse-grained Material

Then, a coarse-grained material of the present embodiment will be described. The coarse-grained material of the present embodiment is constituted of a sulfide solid electrolyte material and is a material before microparticulation.

The coarse-grained material of the present embodiment is not particularly limited as long as it contains sulfur (S) and has an ion conductivity. Among these, the coarse-grained material preferably contains Li, A (A: at least one kind of P, Si, Ge, Al and B) and S. This is because a coarse-grained material having an excellent ion conductivity can be obtained. Further, the coarse-grained material contains, as a main component, Li, A and S. Here, "being a main component" means that a total content of Li, A and S in the coarse material is 50% by mole or more, preferably 60% by mole or more, and still more preferably 70% by mole or more.

Further, the coarse-grained material of the present embodiment is preferably provided with at least an ion conductor containing Li, A and S. Still further, the ion conductor is preferably mainly configured of an anion composition ($PS_4^{3-}$ structure, $SiS_4^{4-}$ structure, $GeS_4^{4-}$ structure, $AlS_3^{3-}$ structure, $BS_3^{3-}$ structure) having an ortho structure described below. This is because a coarse-grained material having high chemical stability can be obtained. A ratio of the anion structure having an ortho composition is, with respect to a total anion structure in the ion conductor, preferably 60% by mole or more, more preferably 70% by mole or more, still more preferably 80% by mole or more, and particularly preferably 90% by mole or more. A ratio of the anion structure having an ortho composition can be determined by Raman spectrometry, NMR, XPS and so on. The coarse-grained material preferably includes the ion conductor and an LiX component (X is a halogen element).

Further, the coarse-grained material of the present embodiment preferably contains Li, A and S as a main component, may contain only Li, A and S, and may further contain other component. In the present embodiment, the coarse-grained material may contain at least one of X (X is a halogen element) and O. This is because when a halogen element is contained, the Li ion conductivity of the coarse-grained material can be improved. Further, by containing O, crosslinking sulfur contained in the coarse-grained material can be decoupled and thereby an amount of generated hydrogen sulfide can be reduced.

The coarse-grained material is preferably made of a raw material composition containing $Li_2S$ and sulfide of A. The raw material composition may further contain at least one of a fluorine-containing compound, a chlorine-containing compound, a bromine-containing compound, an iodine-containing compound and an oxygen-containing compound.

$Li_2S$ contained in the raw material composition preferably contains less impurity. This is because a side reaction can be suppressed. As a method for synthesizing $Li_2S$, a method described in Japanese Patent Application Publication No. 7-330312 (JP 7-330312 A), for example can be cited. Further, $Li_2S$ is preferably purified according to a method described in International Patent Application Publication WO2005/040039. On the other hand, examples of sulfides of A contained in the raw material composition include $P_2S_3$, $P_2S_5$, $SiS_2$, $GeS_2$, $Al_2S_3$, and $B_2S_3$.

The fluorine-containing compound contained in the raw material composition is not particularly limited as long as it contains fluorine. Examples thereof include LiF and LiPF6. The chlorine-containing compound contained in the raw material composition is not particularly limited as long as it contains chlorine. Examples thereof include LiCl. The bromine-containing compound contained in the raw material composition is not particularly limited as long as it contains bromine. Examples thereof include LiBr. The iodine-containing compound contained in the raw material composition is not particularly limited as long as it contains iodine. Examples thereof include LiI. The oxygen-containing compound contained in the raw material composition is not particularly limited as long as it can decouple a bond of crosslinking sulfur contained in the coarse-grained material. Examples thereof include $Li_2O$, $Li_2O_2$, $Na_2O$, $K_2O$, MgO, and CaO. Among these, $Li_2O$ is particularly preferred. This is because O in $Li_2O$ can efficiently decouple the crosslinking sulfur contained in the coarse-grained material. Further, excessively added $Li_2O$, for example, has an advantage that it does not generate hydrogen sulfide even in unreacted state. Further, since $Li_2O$ has Li, the Li ion conductivity of a coarse-grained material obtained by decoupling the crosslinking sulfur can be improved.

The coarse-grained material preferably does not substantially contain $Li_2S$. This is because the coarse-grained material that is less in an amount of generated hydrogen sulfide can be obtained. When $Li_2S$ reacts with water, hydrogen sulfide is generated. When a ratio of $Li_2S$ contained in a raw material composition is large, $Li_2S$ tends to remain. "Not substantially containing $Li_2S$" can be confirmed by X-ray diffraction. Specifically, in the case where peaks of $Li_2S$ ($2\theta=27.0°$, $31.2°$, $44.8°$ and) $53.1°$) are not confirmed, it can be determined that $Li_2S$ is not substantially contained.

It is preferable that the coarse-grained material does not substantially contain crosslinking sulfur. This is because a coarse-grained material that is less in an amount of generated hydrogen sulfide can be obtained. The "crosslinking sulfur" means crosslinking sulfur in a compound obtained by reaction of $Li_2S$ and a sulfide of A. For example, crosslinking sulfur having an $S_3P$—S—$PS_3$ structure obtained by reaction of $Li_2S$ and $P_2S_5$ corresponds thereto. Such crosslinking sulfur tends to react with water and tends to generate hydrogen sulfide. Further, "not substantially containing crosslinking sulfur" can be confirmed by measuring Raman spectrum. For example, in the case of a $Li_2S$—$P_2S_5$ system coarse-grained material, a peak of the $S_3P$—S—$PS_3$ structure appears usually at 402 $cm^{-1}$. Accordingly, it is preferable that the peak is not detected. A peak of $PS_4^{3-}$ appears usually at 417 $cm^{-1}$. In the present embodiment, an intensity $I_{402}$ at 402 $cm_{-1}$ is preferably smaller than an intensity $I_{417}$ at 417 $cm^{-1}$. More specifically, an intensity $I_{402}$ is, with respect to an intensity $I_{417}$, preferably 70% or less, more preferably 50% or less, and still more preferably 35% or less. Further, also a coarse-grained material other than a $Li_2S$—$P_2S_5$ system can be determined not to substantially contain the crosslinking sulfur by specifying a unit containing a crosslinking sulfur and measuring a peak of the unit.

In the case where the coarse-grained material does not substantially contain $Li_2S$ and the crosslinking sulfur, the coarse-grained material usually has an ortho composition or a composition close to that. Herein, the "ortho" generally means an oxoacid having a highest degree of hydration among oxoacids obtained by hydrating the same oxide. In the present embodiment, an ortho composition means a crystal composition of a sulfide with $Li_2S$ most attached. For example, in a $Li_2S$—$P_2S_5$ system, $Li_3PS_4$ corresponds to the ortho composition, in a $Li_2S$—$Al_2S_3$ system, $Li_3AlS_3$ corresponds to the ortho composition, in a $Li_2S$—$B_2S_3$ system, $Li_3BS_3$ corresponds to the ortho composition, in a $Li_2S$—$SiS_2$ system, $Li_4SiS_4$ corresponds to the ortho composition, and in a $Li_2S$—$GeS_2$ system, $Li_4GeS_4$ corresponds to the ortho composition. When the coarse-grained material contains O, S in the ortho composition is partially substituted with oxygen.

In the case of an $Li_2S$—$P_2S_5$ system coarse-grained material, for example, a ratio of $Li_2S$ and $P_2S_5$ for obtaining an ortho composition is $Li_2S: P_2S_5=75:25$ by mole. Also in the case of a $Li_2S$—$Al_2S_3$ system coarse-grained material and in the case of a $Li_2S$—$B_2S_3$ system coarse-grained material, the ratio is the same. On the other hand, in the case of a $Li_2S$—$SiS_2$ system coarse-grained material, a ratio of $Li_2S$ and $SiS_2$ for obtaining an ortho composition is $Li_2S: SiS_2=66.7:33.3$ by mole. Also in the case of $Li_2S$—$GeS_2$ system coarse-grained material, the ratio is the same.

In the case where the raw material composition contains $Li_2S$ and $P_2S_5$, a ratio of $Li_2S$ with respect to a sum total of $Li_2S$ and $P_2S_5$ is preferably in the range of 70 to 80% by mol, more preferably in the range of 72 to 78% by mol, and still more preferably in the range of 74 to 76% by mol. When the raw material composition contains $Li_2S$ and $Al_2S_3$ and when the raw material composition contains $Li_2S$ and $B_2S_3$, the ratio is the same. On the other hand, when the raw material composition contains $Li_2S$ and $SiS_2$, a ratio of $Li_2S$ with respect to a sum total of $Li_2S$ and $SiS_2$ is preferably in the range of 62.5 to 70.9% by mol, more preferably in the range of 63 to 70% by mol and still more preferably in the range of 64 to 68% by mol. Also in the case where the raw material composition contains $Li_2S$ and $GeS_2$, the ratio is the same.

Further, in the case where a coarse-grained material according to the present embodiment is formed of a raw material composition containing LiX (X=F, Cl, Br, I), a ratio of LiX is, for example, preferably in the range of 1 to 60% by mol, more preferably in the range of 5 to 50% by mol, and still more preferably in the range of 10 to 40% by mol. In the present embodiment, the X is preferably at least one of Cl, Br and I. This is because the Li ion conductivity of the coarse-grained material can be improved.

In the case of a $Li_2S$—$Li_2O$—$P_2S_5$ system coarse-grained material, for example, a ratio of $Li_2S$, $Li_2O$ and $P_2S_5$ for obtaining an ortho composition is $(Li_2S+Li_2O): P_2S_5=75:25$ by mol. In the case where the raw material composition contains $Li_2S$, $Li_2O$ and $P_2S_5$, a ratio of $Li_2S$ and $Li_2O$ with respect to a sum total of $Li_2S$, $Li_2O$ and $P_2S_5$ is preferably in the range of 70 to 80% by mol, more preferably in the range of 72 to 78% by mol, and still more preferably in the range of 74 to 76% by mol. A ratio of $Li_2O$ with respect to a sum total of $Li_2S$ and $Li_2O$ is preferably in the range of 1.3 to 33.3% by mol, and more preferably in the range of 4.0 to 20.0% by mol. This is because when a ratio of $Li_2O$ is too low, an amount of generated hydrogen sulfide tends to largely increase, and when a ratio of $Li_2O$ is too high, the Li ion conductivity tends to largely decrease. Further, a ratio of $Li_2O$ with respect to a sum total of $Li_2S$, $Li_2O$ and $P_2S_5$ is preferably in the range of 1 to 25% by mol and more preferably in the range of 3 to 15% by mol.

A coarse-grained material can be in the form of, for example, particles. An average particle size ($D_{50}$) of a coarse-grained material is preferably in the range of 5 to 200 μm and more preferably in the range of 10 to 100 μm. The average particle size can be determined by a particle size distribution meter, for example. The coarse-grained material preferably has a high ion conductivity, and the ion conductivity at room temperature is preferably $1\times10^{-4}$ S/cm or more, and more preferably $1\times10^{-3}$ S/cm or more.

A coarse-grained material may be sulfide glass, crystallized sulfide glass (glass ceramic) or a crystalline material obtained by solid phase process. The sulfide glass can be obtained by applying mechanical milling (ball milling and the like) to a raw material composition, for example. The crystallized sulfide glass can be obtained by heat-treating sulfide glass, for example, at a temperature equal to or higher than a crystallization temperature. When a coarse-grained material is sulfide glass, since it is a particularly soft material, an effect of preventing the sulfide solid electrolyte material from granulating during pulverization and preventing the sulfide solid electrolyte material from adhering to the media can be readily exerted. When a coarse-grained material is sulfide glass, in some cases, high energy cannot be imparted to the coarse-grained material. For example, when due to heat of imparted energy, sulfide glass becomes glass ceramic and the ion conductivity thereof is deteriorated, high energy cannot be imparted to the coarse-grained material. In this case, since the upper limit of energy to be imparted to microparticulate is limited, it is necessary to microparticulate at low energy. However, when an ether compound is used, without imparting excessively high energy, a microparticulated sulfide solid electrolyte material can be obtained.

(3) Solvent

In the present embodiment, in addition to an ether compound, a solvent may be added. This is because when wet pulverization is conducted with a solvent, granulation of the sulfide solid electrolyte material during pulverization and adhesion of the sulfide solid electrolyte material to the media can be inhibited from occurring. Examples of the solvent include alkanes such as heptane, hexane, and octane and aromatic hydrocarbons such as benzene, toluene and xylene. An amount of added solvent is not particularly limited and may be an amount to an extent that can obtain a desired sulfide solid electrolyte material. The solvent is preferred to be less in moisture content. This is because generation of hydrogen sulfide (deterioration of the sulfide solid electrolyte material) can be suppressed.

(4) Pulverization Treatment

A pulverization treatment in the present embodiment is not particularly limited as long as it can microparticulate to a desired size. Examples of the pulverization treatment include media type pulverization such as beads milling and satellite ball milling, jet pulverization and cavitation pulverization. Pulverization conditions are determined so as to pulverize the coarse-grained material to a desired particle size. When a satellite ball mill is used for example, a coarse-grained material, an ether compound, a solvent and pulverizing balls are added, and pulverization is conducted at a predetermined rotational speed for a predetermined time. A diameter ($\phi$) of balls for pulverization is preferably in the range of 0.05 to 2 mm and more preferably in the range of 0.3 to 1 mm. This is because when the diameter of balls is too small, balls for pulverization are difficult to handle and may generate contamination, on the other hand, when the diameter of balls for pulverization is too large, in some cases, it is difficult to pulverize the coarse-grained material to a desired particle size. Further, a rotational speed of a base of a satellite ball mill is preferably in the range of 100 to 400 rpm, and more preferably in the range of 150 to 300 rpm. A time for processing with a satellite ball mill is preferably in the range of 0.5 to 5 hours and more preferably in the range of 1 to 4 hours.

In the present embodiment, pulverization treatment is media type pulverization treatment, and a total pulverization energy E per unit weight of the coarse-grained material, which is defined by the following formula (1), is preferably in the range of 50 to 450 J·sec/g and more preferably in the range of 100 to 300 J·sec/g. This is because a more microparticulated sulfide solid electrolyte material can be obtained. In the present embodiment, in some cases, "total pulverization energy per unit weight of the coarse-grained material" may be simply referred to as total pulverization energy.

$$E = \frac{1}{2}nmv^2/s \cdot t \qquad \text{formula (1)}$$

In the formula (1), n represents the number of media (pieces), m represents weight (kg) per one media, v represents speed of media (m/s), s represents an amount (g) of the coarse-grained material, and t represents a treatment time (sec). The formula (1) shows total pulverization energy when it is assumed that all kinetic energy of the media (beads, balls, for example) is used to pulverize the coarse-grained material. The speed v of media can be appropriately obtained depending on the kind of the media type pulverization treatment. In the case of the satellite ball mill, for example, the speed v of media can be obtained by a formula (2).

$$v = d\pi R\alpha/1000/6 \qquad \text{formula (2)}$$

In the formula (2), d represents a diameter (mm) of a pot (vessel), R represents the rotational speed of the base (rpm), and a represents a rotation/revolution ratio.

On the other hand, when the pulverization treatment is the cavitation pulverization, the rotational speed is preferably in the range of 1000 to 3000 rpm. A flow rate is preferably in the range of 1.0 to 3.0 g/min.

In the present embodiment, an ether compound is used to pulverize the coarse-grained material. Since the ether compound can work as a dispersing agent of the coarse-grained material, the coarse-grained material can be inhibited from adhering and granulating. As a result, the microparticulated sulfide solid electrolyte material can be recovered at a high recovery rate. The recovery rate of the sulfide solid electrolyte material is preferably 90% or higher and more preferably 95% or higher. The recovery rate can be calculated according to (an amount of recovered microparticulated sulfide solid electrolyte material)/(an amount of inputted coarse-grained material).

2. Other Steps

In the present embodiment, after the step of microparticulation, it is preferred to have a step of drying to remove an ether compound. This is because when an ether compound remains, it may deteriorate the ion conductivity of a sulfide solid electrolyte material. When the step of pulverization is conducted with a solvent added, it is preferable to remove also the solvent by the step of drying. A drying temperature is not particularly limited. However, when sulfide glass is synthesized, it is necessary to dry at a temperature lower than a crystallization temperature. In particular, when sulfide glass crystallizes to decrease the ion conductivity, it is necessary to pay attention to a drying temperature.

On the other hand, in the present embodiment, after the step of microparticulation or after the step of drying, a step of heat-treating the microparticulated material at a temperature equal to or higher than the crystallization temperature may be added. This is because microparticulated crystallized sulfide glass (glass ceramic) can be obtained. In particular, in the case where the ion conductivity can be improved by crystallizing sulfide glass, the step of heat-treating is preferably performed. The heat-treatment temperature is not particularly limited as long as it is a temperature equal to or higher than the crystallization temperature. However, it is preferable to adjust so as to generate a crystalline phase that has a high ion conductivity (so as not to generate a unnecessary crystalline phase). The situation is the same also regarding the heat treatment time.

3. Microparticulated Sulfide Solid Electrolyte Material

An average particle size ($D_{50}$) of the sulfide solid electrolyte material obtained by the step of microparticulation is not particularly limited as long as it is smaller than that of the coarse-grained material. The average particle size is preferably in the range of 0.1 to 5 µm, and more preferably in the range of 0.5 to 4 µm. The average particle size can be determined by a particle size distribution meter.

The microparticulated sulfide solid electrolyte material is preferred to maintain the ion conductivity of the coarse-grained material. Specifically, with respect to the ion conductivity of the coarse-grained material, the ion conductivity of the sulfide solid electrolyte material is preferably 50% or more, more preferably 70% or more, still more preferably 80% or more, and particularly preferably 90% or more. The ion conductivity of the sulfide solid electrolyte material can be determined by an AC impedance method, for example.

Further, a sulfide solid electrolyte material obtained according to the present embodiment can be used for any applications that need an ion conductivity. Among these, the sulfide solid electrolyte material is preferably used in whole solid-state batteries (whole solid-state secondary batteries, in particular). Further, when the sulfide solid electrolyte material is used in a whole solid-state battery, it may be used in a positive electrode active material layer, a negative electrode active material layer, or a solid electrolyte layer.

Still further, the present invention can provide a sulfide solid electrolyte material that is obtained by the method for producing a sulfide solid electrolyte material. Further, the present invention can also provide a whole solid-state battery that contains the sulfide solid electrolyte material at least in any one of a positive electrode active material layer, a negative electrode active material layer, and a solid electrolyte layer.

The present invention is not limited to the above embodiments. The above embodiments are only for illustrative purpose, and anything that has substantially the same constitution and produces the same effects as a technical idea that is described in the claims of the present invention is included in the technical scope of the present invention.

With reference to Examples, the present invention will be more specifically described below.

Production Example

As starting raw materials, lithium sulfide ($Li_2S$, manufactured by Nippon Chemical Industrial Co., Ltd., purity: 99.9%), phosphorus pentasulfide ($P_2S_5$, manufactured by Aldrich, purity: 99.9%) and lithium iodide (LiI, manufactured by Aldrich) were used. Then, $Li_2S$ and $P_2S_5$ were measured to be a mole ratio of $75Li_2S \cdot 25P_2S_5$ ($Li_3PS_4$, ortho composition). Then, LiI was measured for a ratio of LiI to be 30% by mol. Then, 2 g of the mixture was charged in a vessel (45 cc, $ZrO_2$) of a satellite ball mill, dehydrated heptane (moisture content: 30 ppm or less, 4 g) was charged, $ZrO_2$ balls (diameter=5 mm, 53 g) were charged, and the vessel was hermetically sealed. The vessel was attached to a satellite ball mill (type: P7, manufactured by Fritsch) and mechanical milling was conducted for 40 hours at the rotational speed of the base of 500 rpm. Thereafter, by drying at 100° C. to remove heptane, sulfide glass (coarse-grained material) was obtained. A composition of the resulted sulfide glass was represented by a formula $xLiI \cdot (100-x)(yLi_2S \cdot (1-y)P_2S_5)$, wherein x=30 and y=0.75.

Example 1

1 g of the coarse-grained material obtained from Production Example, 40 g of $ZrO_2$ balls (diameter: 1 mm), 8.9 g of dehydrated heptane and 0.1 g of dibutyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 150 rpm for 5 hours to pulverize the coarse-grained material, thereby a sulfide solid electrolyte material was obtained.

Example 2

Except that dipropyl ether was used in place of dibutyl ether, in a manner similar to Example 1, a sulfide solid electrolyte material was obtained.

Example 3

1 g of the coarse-grained material obtained from Production Example, 40 g of $ZrO_2$ balls (diameter: 0.3 mm), 8 g of dehydrated heptane and 1 g of dibutyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 150 rpm for 15 hours to pulverize the coarse-grained material, thereby a sulfide solid electrolyte material was obtained.

Example 4

3.5 g of the coarse-grained material obtained from Production Example, 500 ml of dehydrated heptane and 3.5 g of dibutyl ether were mixed, and a mixture of these was obtained. The mixture was pulverized by using a cavitation pulverizer (type SS5, manufactured by M Technique), thereby a sulfide solid electrolyte material was obtained. The conditions of the cavitation pulverizer were set to the rotational speed: 1000 rpm, flow rate: 1.7 g/min, back pressure: 0.14 MPaG, and process pressure: 0.35 MPaG.

Example 5

40 g of the coarse-grained material obtained from Production Example, 800 g of $ZrO_2$ balls (diameter: 1 mm), 156 g of dehydrated heptane and 4 g of dibutyl ether were charged into a 500 ml $ZrO_2$ pot, and the pot was completely hermetically sealed (Ar atmosphere). The pot was attached to a satellite ball mill (type P5, manufactured by Fritsch), wet mechanical milling was conducted at the rotational speed of the base of 90 rpm for 8 hours to pulverize the coarse-grained material, thereby a sulfide solid electrolyte material was obtained.

Comparative Example 1

1 g of the coarse-grained material obtained from Production Example, 40 g of $ZrO_2$ balls (diameter: 1 mm), and 10 g of dehydrated heptane were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 300 rpm for 1 hour to pulverize the coarse-grained material, thereby a sulfide solid electrolyte material was obtained.

Comparative Example 2

1 g of the coarse-grained material obtained from Production Example, 40 g of $ZrO_2$ balls (diameter: 1 mm), 9 g of dehydrated heptane and 0.014 g of butylene rubber were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 300 rpm for 1 hour to pulverize the coarse-grained material, thereby a sulfide solid electrolyte material was obtained.

Comparative Example 3

1 g of the coarse-grained material obtained from Production Example, 40 g of $ZrO_2$ balls (diameter: 1 mm), 8.9 g of dehydrated heptane and 0.1 g of 2-ethyl hexanol were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 800 rpm for 5 hours to pulverize the coarse-grained material, thereby a sulfide solid electrolyte material was obtained.

[Evaluation 1]
(SEM Observation)

Each of the sulfide solid electrolyte materials obtained from Examples 1 to 5 and Comparative Examples 1 to 3 was observed with a scanning electron microscope (SEM). Results thereof are shown in FIGS. 3A to 3E and FIGS. 4A to 4C. As illustrated in FIGS. 3A to 3E and FIGS. 4A to 4C, in all cases, a microparticulated sulfide solid electrolyte material was obtained.

(Particle Size Distribution Measurement)

A slight amount of each of the sulfide solid electrolyte materials obtained from Examples 1 to 5 and Comparative Examples 1 to 3 and the coarse-grained material obtained from Production Example was sampled and subjected to a particle size distribution measurement by a laser diffraction/scattering particle size distribution analyzer (MICROTRAC MT3300EXII, manufactured by Nikkiso), and an average particle size ($D_{50}$) was determined. Results thereof are shown in Table 1.

(Recovery Rate Measurement)

A recovery rate was measured for each of the sulfide solid electrolyte materials obtained from Examples 1 to 5 and Comparative Examples 1 to 3. After the step of microparticulation, the $ZrO_2$ balls were separated, accretion of the $ZrO_2$ balls was washed with heptane several times, a recovered slurry was dried, and an amount of the recovered sulfide solid electrolyte material (sulfide glass) was measured. By dividing the amount of the recovered sulfide solid electrolyte material by an amount of the sulfide glass charged in the step of microparticulation, a recovery rate was calculated. Results thereof are shown in Table 1.

(Measurement of Li Ion Conductivity)

The Li ion conductivity was measured for each of the sulfide solid electrolyte materials obtained from Examples 1 to 5 and Comparative Examples 1 to 3 and the coarse-grained material obtained from Production Example. Regarding the sulfide solid electrolyte materials, after the recovered slurry was dried at 100° C. for 30 minutes and powder was recovered, a pellet of 1 cm$^2$ and 0.5 mm thickness was prepared and molded under 4.3 ton. Regarding also the coarse-grained material, after recovery of powder, a pellet of 1 cm$^2$ and 0.5 mm thickness was prepared and molded under 4.3 ton. The Li ion conductivity (room temperature) of the molded pellet was measured by an AC impedance method. In the measurement, SOLARTRON 1260 was used. Measurement conditions were set to input voltage: 5 mV and measurement frequency range: 0.01 to 1 MHz. A value of resistance at 100 kHz was read, and by correcting with a thickness, the Li ion conductivity was calculated. Results thereof are shown in Table 1.

TABLE 1

| | Average particle size (μm) | Recovery rate (%) | Li ion conductivity σ (S/cm) |
|---|---|---|---|
| Example 1 | 2.3 | 98 | $1.3 \times 10^{-3}$ |
| Example 2 | 2.7 | 96 | $1.2 \times 10^{-3}$ |
| Example 3 | 0.9 | 95 | $1.0 \times 10^{-3}$ |
| Example 4 | 3.1 | 90 | $1.1 \times 10^{-3}$ |
| Example 5 | 2.4 | 96 | $1.2 \times 10^{-3}$ |
| Comparative Example 1 | 7.2 | 2 | $8.1 \times 10^{-4}$ |
| Comparative Example 2 | 3.8 | 60 | $7.5 \times 10^{-4}$ |
| Comparative Example 3 | 2.1 | 98 | $4.2 \times 10^{-5}$ |
| Production Example | 32.3 | — | $1.2 \times 10^{-3}$ |

As shown in Table 1, with respect to the coarse-grained material obtained from Production Example, all of the sulfide solid electrolyte materials obtained from Examples 1 to 5 were smaller in average particle size, higher in recovery rate, and lower in deterioration of the Li ion conductivity. On the other hand, in Comparative Examples 1 to 3, all of these characteristics could not be simultaneously achieved. In Comparative Example 1, after the step of microparticulation, the sulfide glass attached to $ZrO_2$ balls like gum, and particulate sulfide glass could not be obtained, and accordingly, the recovery rate of the sulfide solid electrolyte material was very low.

Example 6

1 g of the coarse-grained material obtained from Production Example, 40 g of $ZrO_2$ balls (diameter: 1 mm), 8.9 g of dehydrated heptane and 0.1 g of dibutyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 150 rpm for 7 hours to pulverize the coarse-grained material, thereby a sulfide solid electrolyte material was obtained.

Example 7

1 g of the coarse-grained material obtained from Production Example, 40 g of $ZrO_2$ balls (diameter: 1 mm), 8.9 g of dehydrated heptane and 0.1 g of dipropyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 150 rpm for 5 hours to pulverize the coarse-grained material, thereby a sulfide solid electrolyte material was obtained.

Example 8

40 g of the coarse-grained material obtained from Production Example, 800 g of $ZrO_2$ balls (diameter: 1 mm), 156 g of dehydrated heptane and 4 g of dibutyl ether were charged into a 500 ml $ZrO_2$ pot, and the pot was completely hermetically sealed (Ar atmosphere). The pot was attached to a satellite ball mill (type P5, manufactured by Fritsch), wet mechanical milling was conducted at the rotational speed of the base of 90 rpm for 8 hours to pulverize the coarse-grained material, thereby a sulfide solid electrolyte material was obtained.

Example 9

1 g of the coarse-grained material obtained from Production Example, 40 g of $ZrO_2$ balls (diameter: 1 mm), 8.9 g of dehydrated heptane and 0.1 g of dibutyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 800 rpm for 4 hours to pulverize the coarse-grained material, thereby a sulfide solid electrolyte material was obtained.

Example 10

1 g of the coarse-grained material obtained from Production Example, 40 g of $ZrO_2$ balls (diameter: 1 mm), 8.9 g of dehydrated heptane and 0.1 g of dibutyl ether were charged into a 45 ml $ZrO_2$ pot, and the pot was completely hermetically sealed (Ar atmosphere). The pot was attached to a satellite ball mill (type P7, manufactured by Fritsch), wet mechanical milling was conducted at the rotational speed of the base of 100 rpm for 1 hour to pulverize the coarse-grained material, thereby a sulfide solid electrolyte material was obtained.

Reference Example 1

1 g of the coarse-grained material obtained from Production Example, 40 g of ZrO$_2$ balls (diameter: 1 mm), 8 g of dehydrated heptane and 0.014 g of butylene rubber were charged into a 45 ml ZrO$_2$ pot, and the pot was completely hermetically sealed (Ar atmosphere). The pot was attached to a satellite ball mill (type P7, manufactured by Fritsch), wet mechanical milling was conducted at the rotational speed of the base of 300 rpm for 1 hour to pulverize the coarse-grained material, thereby a sulfide solid electrolyte material was obtained.

Reference Example 2

40 g of the coarse-grained material obtained from Production Example, 400 g of ZrO$_2$ balls (diameter: 1 mm), 160 g of dehydrated heptane and 0.56 g of butylene rubber were charged into a 500 ml ZrO$_2$ pot, and the pot was completely hermetically sealed (Ar atmosphere). The pot was attached to a satellite ball mill (type P5, manufactured by Fritsch), wet mechanical milling was conducted at the rotational speed of the base of 100 rpm for 5 hours to pulverize the coarse-grained material, thereby a sulfide solid electrolyte material was obtained.

Reference Example 3

1 g of the coarse-grained material obtained from Production Example, 40 g of ZrO$_2$ balls (diameter: 1 mm), 9 g of dehydrated heptane and 0.014 g of butylene rubber were charged into a 45 ml ZrO$_2$ pot, and the pot was completely hermetically sealed (Ar atmosphere). The pot was attached to a satellite ball mill (type P7, manufactured by Fritsch), wet mechanical milling was conducted at the rotational speed of the base of 400 rpm for 5 hours to pulverize the coarse-grained material, thereby a sulfide solid electrolyte material was obtained.

[Evaluation 2]

A slight amount of each of the sulfide solid electrolyte materials obtained from Examples 6 to 10 and Reference Examples 1 to 3 was sampled and subjected to a particle size distribution measurement by a laser diffraction/scattering particle size distribution analyzer (MICROTRAC MT3300EXII, manufactured by Nikkiso), and an average particle size (D$_{50}$) was determined. Results thereof are shown in Table 2. A relationship between total pulverization energy and average particle size is shown in FIG. 5.

TABLE 2

| | Peripheral speed (m/s) | Total pulverization energy (J · sec/g) | Average particle size (μm) |
|---|---|---|---|
| Example 6 | 0.63 | 199 | 3.2 |
| Example 7 | 0.63 | 142 | 2.7 |
| Example 8 | 1.04 | 309 | 2.5 |
| Example 9 | 3.35 | 3230.8 | 9.9 |
| Example 10 | 0.42 | 12.6 | 8.3 |
| Reference Example 1 | 1.26 | 114 | 3.8 |
| Reference Example 2 | 1.15 | 119 | 3.8 |
| Reference Example 3 | 1.67 | 1009.6 | 5.1 |

Figure 5:
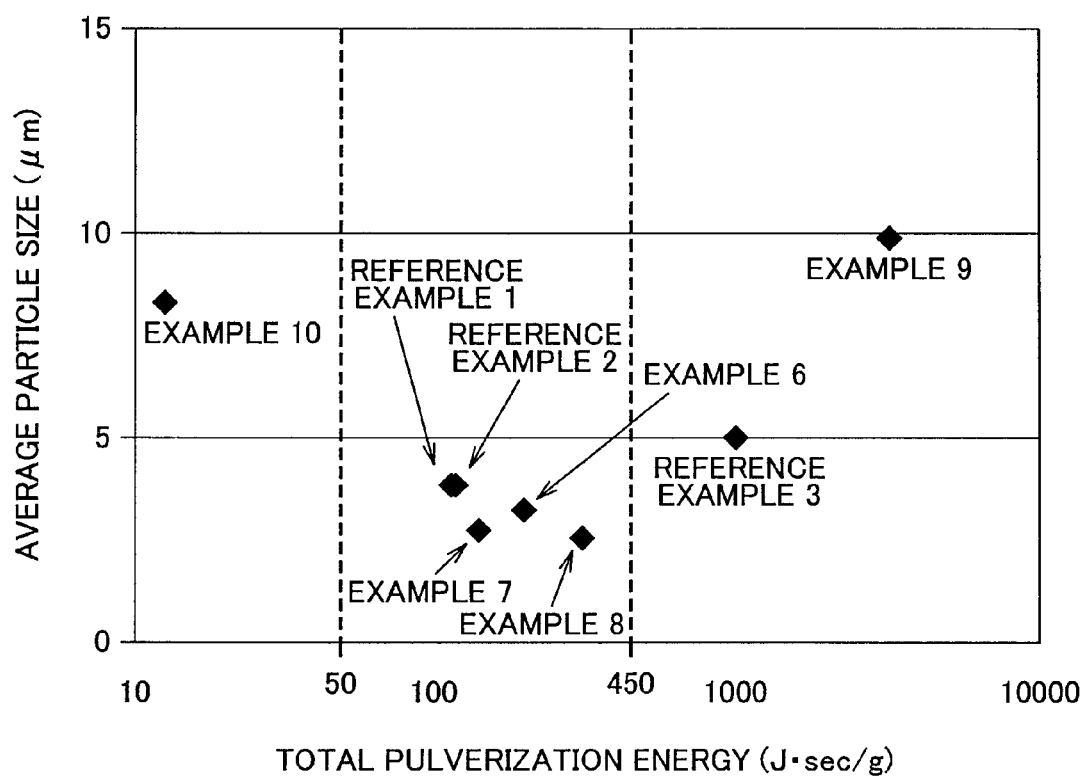
FIG. 5 is a graph showing a relationship between total pulverization energy and average particle size.

As shown in Table 2 and FIG. 5, it was confirmed that when the total pulverization energy is in the range of 50 to 450 J·sec/g, sulfide solid electrolyte materials having an average particle size of 5 μm or less can be obtained.

The invention claimed is:

1. A method for producing sulfide solid electrolyte particles, comprising:
    forming granules including Li, A and S, wherein the granules are formed from a raw material composition containing Li2S and a sulfide of A, where A is at least one element selected from the group consisting of P, Si, Ge, Al and B;
    adding an ether compound to the granules and forming a mixture of the ether compound and the granules; and
    pulverizing the granules by subjecting the mixture of the ether compound and the granules to a pulverization treatment such that microparticles formed of the sulfide solid electrolyte material are obtained.

2. The method according to claim 1, wherein the ether compound includes two hydrocarbon groups bonded to an oxygen element and the number of carbons of each of the hydrocarbon groups is 10 or less.

3. The method according to claim 1, wherein A is P.

4. The method according to claim 1, wherein the granules further includes X, and X is a halogen element.

5. The method according to claim 1, wherein the pulverization treatment is a media pulverization treatment and total pulverization energy E per unit weight of the granules defined by the following formula (1) ranges from 50 to 450 J·sec/g, $$E = \tfrac{1}{2}nmv^2/s \cdot t \qquad \text{formula (1)}$$

where
n is the number of media;
m is a mass in kilograms per one media;
v is a speed in meters per second of media;
s is an amount in grams of the granules; and
t is a treatment time in seconds.

6. The method according to claim 1, wherein an ion conductivity of the granules at room temperature is 1×10$^{-4}$ S/cm or more.

7. The method according to claim 1, wherein an ion conductivity of the granules at room temperature is 1×10$^{-3}$ S/cm or more.

8. The method according to claim 1, wherein an ion conductivity at room temperature of the microparticles formed of the sulfide solid electrolyte material is equal to or greater than 50% of an ion conductivity at room temperature of the granules that had not been subjected to the pulverization treatment.

9. The method according to claim 1, wherein an average particle size D50 of the granules is greater than an average particle size D 50 of the microparticles formed of the sulfide solid electrolyte material.

10. The method according to claim 1, wherein an average particle size D50 of the granules is 5 to 200 μm.

11. The method according to claim 1, wherein the granules to which the ether compound is added are only composed of Li, A and S.

12. The method according to claim 4, wherein the granules to which the ether compound is added are only composed of Li, A, S, and X.

13. The method according to claim 4, wherein the granules to which the ether compound is added are only composed of Li, A, S, O and X.

14. The method according to claim 1, wherein the granules to which the ether compound is added are only composed of Li, A, S, and O.

\* \* \* \* \*